United States Patent
Moesle

(10) Patent No.: US 7,668,208 B2
(45) Date of Patent: Feb. 23, 2010

(54) METHOD FOR SYNCHRONIZING PACKET BASED DIGITAL DATA STREAMS

(75) Inventor: Frank Moesle, Stuttgart (DE)

(73) Assignee: Sony Deutschland GmbH, Cologne (DE)

( * ) Notice: Subject to any disclaimer, the term of this patent is extended or adjusted under 35 U.S.C. 154(b) by 733 days.

(21) Appl. No.: 10/926,669

(22) Filed: Aug. 26, 2004

(65) Prior Publication Data
US 2005/0047446 A1 Mar. 3, 2005

(30) Foreign Application Priority Data
Aug. 28, 2003 (EP) .................. 03019467
Dec. 10, 2003 (EP) .................. 03028288

(51) Int. Cl.
*H04J 3/06* (2006.01)
*H04L 7/00* (2006.01)
*H04N 9/47* (2006.01)

(52) U.S. Cl. .................. 370/509; 375/354; 348/513
(58) Field of Classification Search ......... 370/503–520; 375/354–356, 365, 366; 348/14.12, 194, 348/500, 513, 521
See application file for complete search history.

(56) References Cited

U.S. PATENT DOCUMENTS 5,594,660 A * 1/1997 Sung et al. ............... 715/500.1
6,233,256 B1 * 5/2001 Dieterich et al. ............ 370/506
6,507,592 B1 * 1/2003 Hurvig et al. ............... 370/503
6,567,424 B1 * 5/2003 Girardeau, Jr. .............. 370/509
6,600,759 B1 * 7/2003 Wood ......................... 370/516
2001/0031009 A1 10/2001 Knee et al.

FOREIGN PATENT DOCUMENTS

EP  0 881 840 A2  12/1998
EP  1 162 845 A2  12/2001

OTHER PUBLICATIONS

Herpel, C. "Der MPEG-2-Standard: Generische Codierung Fuer Bewegtbilder und Zugehoerige Audio-Information, Hierarchische Video-Codierung: Ansaetze Zur Service-Interoperabilitaet (Tiel 3)" Gernseh und Kinotechnik, VDE Verlag GmbH., Berlin, DE, vol. 48, No. 6, Jun. 1, 1994, pp. 311-316, 318.

* cited by examiner

*Primary Examiner*—Aung S Moe
*Assistant Examiner*—Kerri M Rose
(74) *Attorney, Agent, or Firm*—Oblon, Spivak, McClelland, Maier & Neustadt, L.L.P.

(57) ABSTRACT

The present invention relates to a method for synchronizing packet-based digital data streams. Key idea of the inventive method is to perform a state machine process (S3) with respect to received primary digital data streams (D1-1, D1-2) based on derived time stamp structure data (TSD), thereby synchronization state data (SSD) are generated which are representative for the synchronization state of the received primary digital data streams (D1-1, D1-2).

19 Claims, 3 Drawing Sheets

| current state | \[packet positions →\] | | | | | | | | | | number of packets to read from stream 1 | number of packets to read from stream 2 | next state |
|---|---|---|---|---|---|---|---|---|---|---|---|---|---|
| A | $1_2$ | $2_2$ | | | | | | | | | 2 | 0 | A/B/F |
| B | | $2_2$ | | $1_2$ | | | | | | | 2 | 1 | F |
| C | | $2_2$ | | | | $1_2$ | | | | | 2 | 1 | F |
| D | | $2_2$ | | | | | | $1_2$ | | | 2 | 1 | F |
| E | | $2_2$ | | | | | | | | $1_2$ | 2 | 1 | F |
| F | | | | $2_2$ | | | | | | | 0 | 0 | F, TS |
| G | | | | $2_2$ | | $1_2$ | | | | | 1 | 1 | F |
| H | | | | $2_2$ | | | | $1_2$ | | | 1 | 1 | F |
| I | | | | | | | | $2_2$ | | $1_2$ | 0 | 1 | F |
| J | | | | | | | | $2_2$ | | | 0 | 1 | F |
| K | | | | | | | | $2_2$ | $1_2$ | | 0 | 1 | I |
| L | | | | | | | | | | $2_2$ | 0 | 1 | K |

Table 1: A possible state machine for $n_1=4$, $n_2=2$. Oldest packets are on the left side, newest packets are on the right side. The index gives the number of the stream, e.g. $3_1$ is the third packet of stream 1.

Fig. 2

METHOD FOR SYNCHRONIZING PACKET BASED DIGITAL DATA STREAMS

The present invention relates to a method for synchronizing packet-based digital data streams.

When transmitting and/or processing digital data streams which are generated and/or which exist in parallel, for instance digital data streams of video data and auxiliary or helper data, synchronization of the respective data streams is often a crucial point. Without having a distinct and certain temporal relationship or temporal order, the respective received data streams cannot be adequately further processed. This is in particular true when simultaneous processing of parallel data streams is necessary.

Therefore, several approaches for synchronizing received digital data streams have been proposed. A main aspect is in general to delay the respective data streams in a certain way until a state of proper synchronization or a proper temporal relationship or order between the respective digital data streams is achieved. Only when such a state of proper synchronization is found, i. e. a respective delay process or delay cascade has been completed, subsequent processes or components are started to further process the respective received digital data streams. Such an approach may be rather time-consuming.

It is an object of the present invention to provide a method for synchronizing packet-based digital data streams which works in a reliable manner with a comparable low time-consumption, i. e. without blocking steps or components of further processing.

The object is achieved by a method for synchronizing packet-based digital data streams according to the features of independent claim 1. Preferred embodiments of the inventive method for synchronizing packet-based digital data streams are defined in the dependent sub-claims 2 to 18. The object is further achieved by an apparatus or system, a computer program product, and a computer readable storage medium according to the features of independent claims 19, 20, and 21, respectively.

The inventive method for synchronizing packet-based digital data streams comprises first of all a step of receiving, providing and/or generating primary packet-based digital data streams. In a following step of deriving and/or analyzing a time stamp structure of said primary digital data streams and/or the structure of said primary digital data streams itself, time stamp structure data are generated which are descriptive and/or representative for the analysis result and/or for said time stamp structure and/or said structure itself. Then, a state machine process is performed with respect to said primary digital data streams which is based on said time stamp structure data, in particular by involving a finite size state machine means, thereby generating and/or providing synchronization state data. Said synchronization state data are representative and/or descriptive for the synchronization state of said primary digital data streams. Finally, respective and corresponding secondary digital data streams are generated and/or output with respect to said primary digital data streams. Generating and/or outputting of said secondary digital data streams is in particular based on said synchronization state data. Alternatively or additionally, said synchronization state data are output.

It is therefore a key idea of the present invention to perform an analysis with respect to the structure and/or the time stamps or time stamp structure of received primary digital data streams. Based on the respective analysis result and using said analysis result, a state machine process with respect to said primary digital data streams is performed. As a result of said state machine process, synchronization state data are generated and/or provided which are representative and/or descriptive for the synchronization state of said received primary digital data streams. Further, respective and corresponding secondary digital data streams are generated and/or output. Additionally or alternatively, said synchronization state data are output. This is in particular done to accordingly inform possible further processing steps and/or components with respect to the synchronization state of the primary digital data streams and/or the secondary digital data streams.

According to a preferred embodiment of the inventive method for synchronizing packet-based digital data streams, the time stamps of the primary digital data streams, said respective time stamp structure data and/or said synchronization state data are chosen and/or designed to refer to and/or to be based on a same and common clock.

Preferably, the involved state machine process is designed and/or adapted to solve any possible non-synchronous situation state of said received primary digital data streams, in particular for further processing.

Additionally or alternatively, for each primary digital data stream a respective certain number of data packets is read after said analyzing step and/or for a respective step of further processing.

Further additionally or alternatively, within or for said state machine process each combination of temporal relationship or relationships of data packets, in particular having said respective certain numbers, and/or for each temporal order thereof are assigned to a respective certain state of said state machine process.

In this case, one target state may be given according to which the respective primary digital data streams have a temporal relationship and/or a temporal order which are sufficient and/or appropriate, in particular for a correct further processing of said primary digital data streams. That means, that a given temporal relationship and/or temporal order are assigned to said target state if and only if said temporal relationship and/or temporal order is sufficient and/or appropriate.

It is of further advantage to give, assign, define and/or generate for each state of said state machine process a given respective certain number of data packets to be read from each of said respective primary digital data streams. This means, that for a state machine process the respective certain number of data packets to be read is in particular designed and/or chosen to achieve by reading the respective number of data packets from said respective primary digital data streams a consecutive state of said state machine process to thereby come closer to an appropriate and/or sufficient temporal relationship and/or order or to come closer to said target state according to which a sufficient and/or appropriate temporal relationship is given between said primary digital data streams or the modifications thereof.

Therefore, according to a further preferred embodiment of the present invention for each state of said state machine process, the process of reading the assigned numbers of packets of each of said primary digital data streams leads to a further state machine process and/or to a respective adapted temporal relationship and/or temporal order of the respective primary digital data streams and/or of modifications thereof.

According to a further preferred embodiment of the inventive method for synchronizing packet-based digital data streams, said state machine process is performed iteratively, in particular until said target state is reached after a finite number of iterations.

As a further addition or as a further alternative, for each of said primary digital data streams a sequence of intermediate digital data streams is generated, in particular having an altered temporal relationship and/or an altered temporal order. In this case the respective total numbers of sequence elements in each sequence of intermediate digital data streams may be identical and/or may depend on the temporal relationship and/or the temporal order of the primary digital data streams.

In these cases, the respective last element of each of the sequences of said intermediate digital data streams may be chosen and/or may be designed to correspond to said respective secondary digital data streams having a temporal relationship and/or temporal order suitable for further processing.

Additionally or alternatively, each of said sequence elements may be generated during a respective iteration step of said state machine process thereby realizing an iterative temporal or synchronization adaptation.

According to the last two measures described above, the inventive method for synchronizing packet-based digital data streams, the method does not only analyze and describe the temporal relationship and/or the temporal order of the received digital data streams and their packets but also performs the temporal reorganization and/or reorder to achieve a synchronization of the received primary digital data streams within the inventive method itself.

In contrast, the following measures describe an embodiment of the inventive method for synchronizing packet-based digital data streams according to which the synchronization is only prepared by supplying respective synchronization state data and possible operations to resolve a non-synchronization state.

According to this particular situation for each of said primary digital data streams a sequence of sequential pre-processing operations, in particular reading operations with respect to said primary digital data streams, is generated, in particular as at least a part of said synchronization state data and/or in particular within said state machine process.

According to this measure, the total numbers of sequence elements of each sequence of operations may be identical and/or may be dependent on the temporal relationship and/or temporal order of said primary digital data streams.

Additionally and/or alternatively, said sequence of said sequential pre-processing operations, in particular of said reading operations with respect to said primary digital data streams may be chosen and/or designed to realize a modified temporal relationship and/or a temporal order of the primary digital data streams or of modifications thereof if the respective pre-processing operations were applied to said primary digital data streams in the sequential order.

In these above described cases said sequence of pre-processing operations may be given as a processing table and/or as a processing list.

The inventive method for synchronizing packet-based digital data streams may apply to various technical situations. Therefore, said primary digital data streams may be chosen from the group containing video data streams, audio data streams, helper data streams, and/or the like.

According to a further aspect of the present invention, an apparatus and/or a system is provided which is adapted and/or designed to realize and/or to perform the inventive method for synchronizing packet-based digital data streams.

According to a further aspect of the present invention, a computer program product is provided which comprises a computer program means which is adapted and/or designed to realize and/or to perform the inventive method for synchronizing packet-based digital data streams and/or the steps thereof and/or the system for synchronizing packet-based digital data streams.

These and further aspects of the present invention will be discussed by means of the following remarks:

This invention proposes a new method for synchronization of at least two packetized streams, for example—but not limited to—video and motion vectors. The basic concept starts with the analysis of the structure and the time stamps of the streams. The analysis result is passed to a state machine to find an optimized way for solving any possible non-synchronous situation. Signaling channels are used to inform the following components of the system about the synchronization state.

Current state of the art for synchronizing two video streams is a one-shot approach. Before processing of video, one stream is delayed until a state of proper synchronization is found. Only when this is completed, the subsequent components can start processing the streams. Especially on start-up of the system and during times with very high load of the processor (DSP), this synchronization may take a considerable amount of time. Until the streams are synchronized, the subsequent processing is suspended, which leads to a delay in video display.

A basic idea of the invention is the synchronization of at least two streams (for example one video stream and one helper information stream) in an iterative approach, which does not block the video processing in the following components of the system.

According to a preferred embodiment two input streams are connected to the synchronization system. The streams consist of packets with at least two pieces of information: a header and a payload. For typical interlaced video streams, the header contains at least the following information: First, a piece of information identifying whether the payload belongs to a top field of the interlaced stream or to a bottom field of the interlaced stream (=field ID), and second, a time stamp describing the time at which the payload arrived at the system. The time stamps for both input streams must take reference to the same clock. For the typical use-case of a 50-to-100 Hz frame-rate conversion system, the payload of the first stream consists of video images in a compressed or uncompressed format, while the second stream consists of helper information which improves the frame-rate conversion quality. This helper information could be a data array containing motion vectors. The subsequent block could be the frame-rate-conversion unit, but the invention is not limited to this use-case. For the subsequent processing block, it is necessary that video images and helper information always arrive synchronized. In case they are not synchronized, this must be indicated to the subsequent processing block.

It is assumed that the frame-rate conversion unit needs n1 packets of stream 1 (e.g. video) and n2 packets of stream 2 (synchronized helper information) at one processing step. Additionally, it is assumed that the first packet of a stream has to have the field ID fj (j=1 . . . 2 for stream j).

On start-up, n1 packets are read from the first stream, and n2 packets from the second stream. The field ID of the first packet is evaluated. In case the field ID of stream j (j=1 . . . 2) does not match the required field ID fj, an additional packet is read from stream J.

In a typical stream, the field IDs have to be alternating. Therefore, the field IDs of all other packets are evaluated, too. If the field IDs are not alternating, the analysis is stopped and all packets are passed directly to the motion detection unit. A "not good" indicator is supplied on a signaling channel. The motion detection unit evaluates the streams to see if the video streams contain moving video or static images. For this evaluation, a state-of-the-art motion detector may be applied. Alternatively, if the second stream already contains motion information, the second stream may be evaluated. The motion detection unit passes the packets to the subsequent processing, including the motion information, which is the result of the motion detection.

If all field IDs are as expected, the packets are passed to the time stamp evaluation unit. The time stamps of all packets of the two streams are compared and the result is saved. For nj packets in the two streams j, there is only a limited number of possibilities how the time stamps can relate. Some, but not all possibilities are:

all packets of the second stream are earlier than the first stream, all packets of the second stream are earlier except one packet, which is between packet 1 and 2 of the first stream, all packets of the second stream are earlier except one packet, which is between packet 2 and 3 of the first stream,

. . .

all packets of the second stream are later than the first stream.

For the case of n1=4 and n2=2, all possible combinations are listed in Table 1 of FIG. 2.

As the amount of packets is limited, all possible combinations get a unique identifier. In table 1, this is a letter from A to L. Each combination is called a state. For each state, there is a pre-defined way to another state to resolve a non-synchronous situation. Therefore, this component is called a state machine.

The state machine can be implemented as a lookup table, which has been filled with data on design of the system. There is one combination, which is the ideal state. This state is defined by the requirements of the subsequent processing block, e.g. by the frame-rate conversion algorithm. The lookup table contains for each state a suitable way to get from the wrong state to the ideal state by reading additional packets from one or both streams. In the example in Table 1, the second and third column from the right give the number of packets to read per stream. The last column indicates the state which will be next.

There is a target state TS for each system. This is the state, in which the streams are a relationship that they can be used for correct processing. Some states will not lead to the target state TS within one step, hence this is called an iterative approach. In the example of table 1, target state TS is state F. In this case, the packets are passed to the subsequent processing with a "good" indicator on the signaling channel. In any other case, the packets are passed with a "not good" indicator.

In case the packets are in the ideal combination ("good" indication), the motion detection unit may be bypassed, unless the result is needed somewhere later in the system.

The processing unit, which may be a frame-rate conversion unit, receives all n1 packets from the first stream and n2 packets from the second stream. Additionally it consumes the analysis result of the synchronization block on the signaling channel, and also the motion information. In case of "good" indication from the synchronization unit, frame-rate conversion of the first stream is performed using the helper information from the second stream. In case of "not good", the second stream does not match to the first stream, so a backup algorithm must be used. Different backup algorithms (like frame repetition and field repetition) are used depending on the result of the motion detection unit.

Basic advantages of the invention are an optimal and robust solution, which does not block the following components of the system, and a possible adaptation to software or hardware solutions.

In the following the present invention will be discussed in more detail by taking reference to the accompanying Figures:

FIG. 2 is a table for elucidating a preferred embodiment of the inventive method for synchronizing packet-based digital data streams.

In the following, similar, comparable and/or equivalent elements and/or functionalities are denoted by the same reference symbols. Their detailed description will not be repeated in each case of their occurrence.

FIG. 1 is a schematical block diagram elucidating a preferred embodiment of the inventive method for synchronizing packet-based digital data streams.

In a first step S1 of receiving primary digital data streams D1-1 and D1-2 said primary digital data streams D1-1 and D1-2 are received and forwarded to a following step S2 of analyzing the time stamps, the time stamp structure and/or the structure of the received primary digital data streams D1-1 and D1-2 itself. Thereby, time stamp structure data TSD are generated and/or provided. Together with said time stamp structure data TSD said primary digital data streams D1-1 and D1-2 are forwarded to a further step S3 of a state machine process wherein based on said primary digital data streams D1-1 and D1-2 and said time stamp structure data TSD secondary digital data streams D2-1 and D2-2 and/or synchronization state data SSD are generated and/or are provided as output data for a step S4 of outputting said synchronization state data SSD and/or said secondary digital data streams D2-1 and D2-2, for instance for further processing steps S50, S60 described below.

Figure 1:
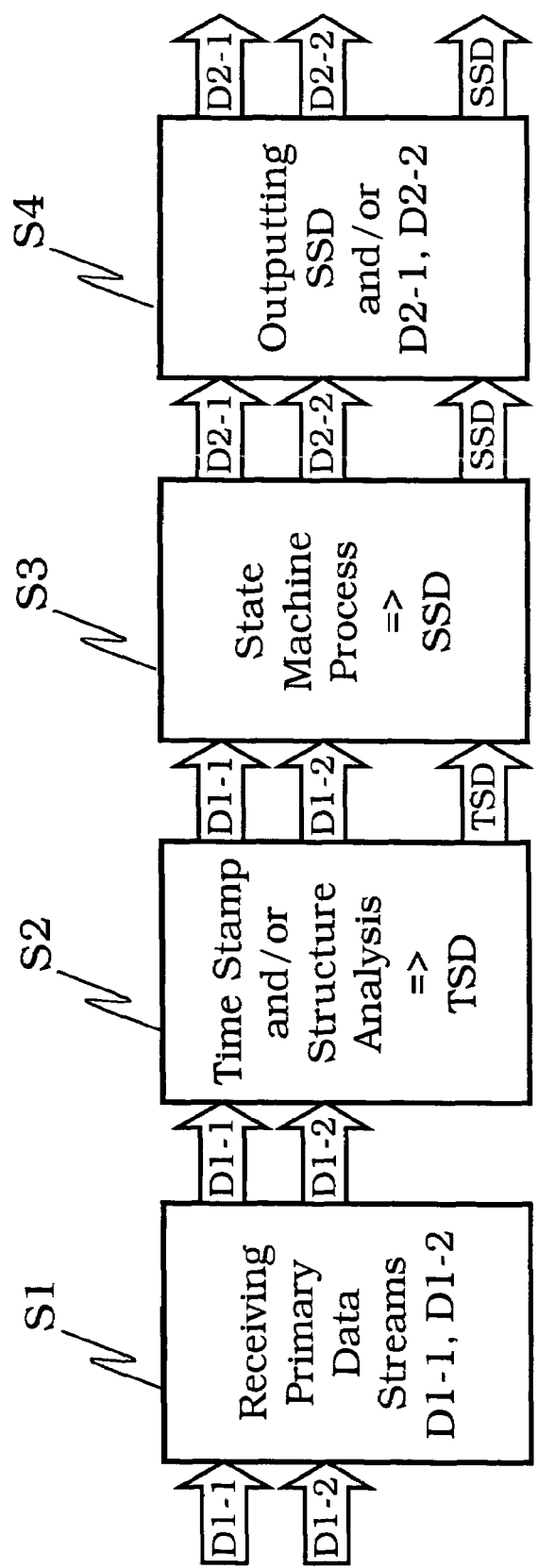
FIG. 1 is a schematical block diagram describing some basic aspects of the inventive method for synchronizing packet-based digital data streams.

Although, in FIG. 1 only two parallel primary digital data streams D1-1 and D1-2 are received and pre-processed for synchronization, the invention may also be applied to a plurality of primary digital data streams comprising more than two primary digital data streams.

Table 1 shown in FIG. 2 is a table of possible states of an example for a state machine process S3 or a respective state machine S33 for the case that n1=4 data packets of a first primary digital data stream D1-1 and n2=2 data packets of a second primary digital data stream D1-2 are necessary to be read for each processing step. In Table 1 of FIG. 2 states A to L are given. Each state corresponds to a distinct temporal order of the four packets $1_1$ to $4_1$ of said first primary digital data stream D1-1 with respect to the two packets $1_2$ and $2_2$ of the second primary digital data stream D1-2. In the most left column, the current state of the state machine according to the state machine process S3 is given and denoted by one of the capital letters A to L. The most right column shows the next state for an iterative state machine process S3 which state is obtained by reading the number of packets from the first primary digital data stream D1-1 as given in the last but two column from the right and by simultaneously reading the number of packets given in the last but one column from the right for said second primary digital data stream D1-2.

For instance, the state machine process S3 is in state A if both packets $1_2$ and $2_2$ read from said second primary digital data stream D1-2 are temporally advanced before all packets $1_1$ to $4_1$ of said first primary digital data stream D1-1. To achieve one of the next states A, B and/or F two packets from said first primary digital data stream D1-1 and zero packets from said second primary digital data stream D1-2 have to be read.

By each of the cases A to L any combination of temporal order or temporal relationships between the packets $1_1$ to $4_1$ of said first primary digital data stream D1-1 and said packets $1_2$, $2_2$ of said second primary digital data stream D1-2 are covered. By going iteratively through the respective consecutive states of the state machine process S3 according to Table 1 of FIG. 2 one finally arrives at the final or termination state TS which is state F according to which the packets have the appropriate order of $1_1, 1_2, 2_1, 2_2, 3_1, 4_1$, which is appropriate for further processing steps.

Figure 3:
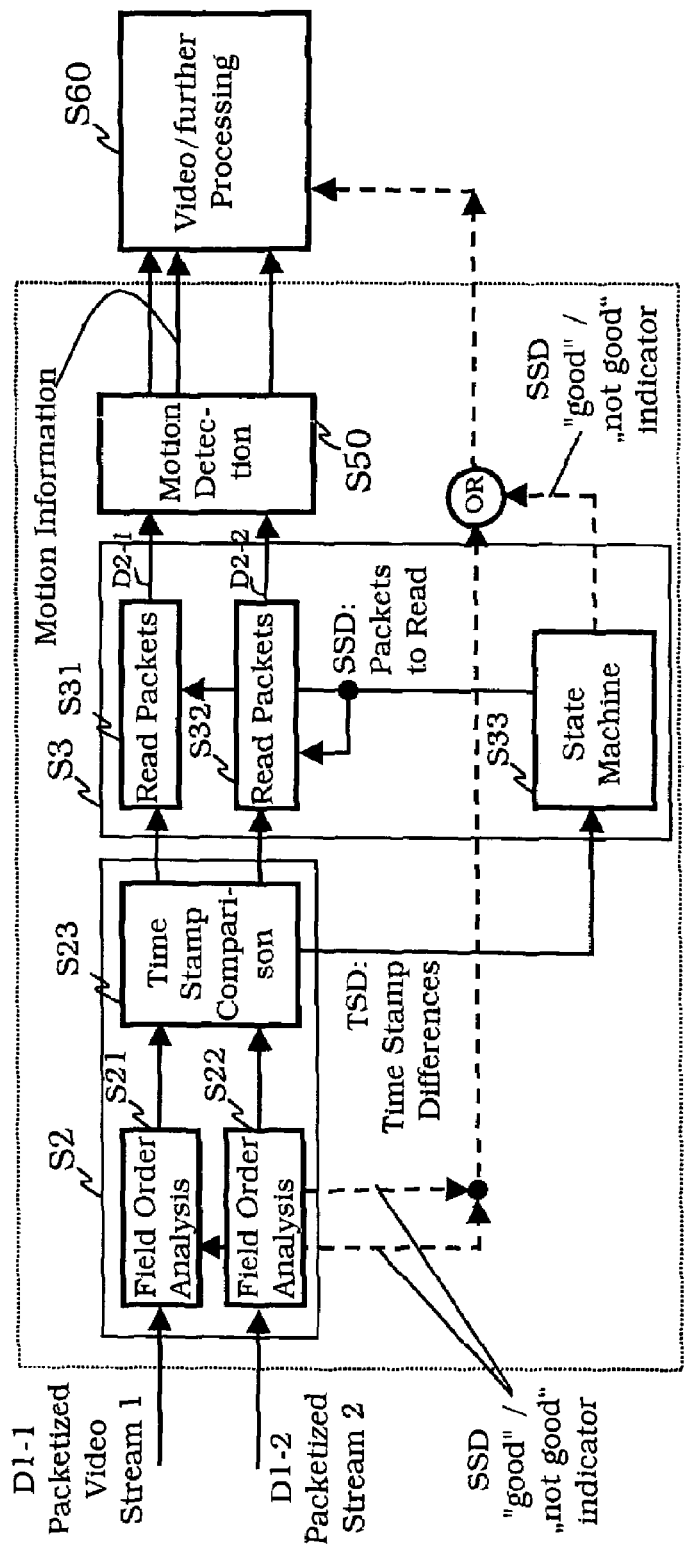
FIG. 3 is a schematical block diagram of a system or apparatus according to the present invention.

As already indicated above, FIG. 3 demonstrates in more detail a realization of the inventive method for synchronizing packet-based digital data streams in the case of a packetized video stream 1 as said first primary digital data stream D1-1 and a helper stream or packetized stream 2 as said second primary digital data stream D1-2, wherein said second primary digital data stream D1-2 contains some kind of motion vectors or motion information with respect to said first primary digital data stream D1-1.

Within said step S2 of analyzing the time stamps, the time stamp structure and/or the structure of the primary digital data streams D1-1 and D1-2 itself and first of all the already above mentioned field order analysis S21 and S22, respectively, is performed to decide on whether or not the respective packets belong to the correct fields. Then, in a following step S23 a time stamp comparison is performed so as to generate and/or provide time stamp differences, for instance within said time stamp structure data TSD. The primary digital data streams D1-1 and D1-2 and said time stamp structure data TSD are supplied and input to a following step S3 wherein the state machine process S3 is performed. By using a state machine S33, for instance by evaluating the Table 1 shown in FIG. 2, respective reading processes S31 and S32 with respect to said first and second primary digital data streams D1-1 and D1-2 are performed. This may be done by supplying synchronization state data SSD including information with respect to the packet to be read to the respective reading processes S31 and S32, respectively. By accordingly performing the reading processes S31 and S32, secondary digital data streams D2-1 and D2-2 are generated and provided, which correspond to the respective primary digital data streams D1-1 and D1-2. These secondary digital data streams D2-1 and D2-2 are transmitted to a following step S50 of motion detection and further together with respective motion information derived and/or provided within said step S50 of motion detection to a further following step S60 of video or another way of further processing.

As indicated by the dashed line, said synchronization state data may also be used as a good/not good indication for the further processing S60. Therefore, the field order analysis steps S21 and S22 may also provide good/not good indications. The good/not good indications are logically combine by an logical OR. The result is supplied to the step of further processing S60.

REFERENCE SYMBOLS

D1-1 first primary digital data stream, packetized video stream
D1-2 second primary digital data stream, packetized helper stream
D2-1 first secondary digital data stream
D2-2 second secondary digital data stream
S1 step/process/unit of receiving, generating and/or providing primary digital data streams
S2 step/process/unit of analyzing time stamps, time stamp structure, and/or structure of primary digital data streams and its packets
S21 field order analysis
S22 field order analysis
S23 time stamp comparison
S3 state machine process, state machine
S31 step/process/unit of reading packets
S32 step/process/unit of reading packets
S33 state machine
S4 providing/outputting synchronization state data SSD and/or secondary digital data streams D2-1, D2-2
S50 step/process/unit of motion detection
S60 step/process/unit of video/further processing
SSD synchronization state data
TSD time stamp structure data

The invention claimed is:

1. A method for synchronizing packet-based digital data streams implemented on an stream synchronizing apparatus, comprising:
   determining, based on a current state of a finite state machine, a first number of data packets to be read from a first primary digital data stream and a second number of data packets to be read from a second primary digital data stream;
   reading, from the first and the second primary digital data streams, the first and the second number of the data packets, respectively, each of the data packets including a time-stamp generated with respect to a common clock;
   determining a temporal order of the time-stamps of the data packets, the temporal order relating to the first and the second primary digital data streams from which the data packets have been read;
   determining a subsequent state of the finite state machine as the current state based on the temporal order;
   outputting respective secondary digital data streams based on said first and second primary digital data streams, and further outputting a signal indicating whether the current state is a target state of the finite state machine, the target state corresponding to a temporal order appropriate for further processing.

2. The method according to claim 1,
   wherein the finite state machine is adapted to solve any possible non-synchronous situation state of said primary digital data streams.

3. The method according to claim 1,
   wherein each possible temporal order of the time-stamps of the data packets is assigned to a respective state of the finite state machine.

4. The method according to claim 3,
   wherein to each state of the finite state machine, the first and the second number of data packets to be read from the respective primary digital data streams is assigned.

5. The method according to claim 3,
   wherein
   the determining and the reading of the first and the second number of data packets, the determining of the temporal order and of the subsequent state and the outputting of the respective secondary digital data streams and the signal is performed iteratively.

6. The method according to claim 1,
   wherein the determining and the reading of the first and the second number of data packets, the determining of the temporal order and of the subsequent state, and the outputting of the respective secondary digital data streams and the signal is performed iteratively until one of target states is reached after a finite number of iterations.

7. The method according to claim 1, wherein for each of said primary digital data streams, a sequence of intermediate digital data streams is generated, said intermediate digital data streams having an altered temporal relationship and/or an altered temporal order.

8. The method according to claim 7, wherein a respective total number of sequence elements in each of the sequences of the intermediate digital data streams are identical and/or dependent on the temporal order of the primary digital data streams.

9. The method according to claim 7, wherein respective last elements of each of the sequences of said intermediate digital data streams correspond to a respective one of the secondary digital data streams and have a temporal relationship and/or temporal order suitable for further processing.

10. The method according to claim 7, wherein each of said sequence elements is generated during a respective iteration step of said state machine process thereby realizing an iterative temporal or synchronization adaptation.

11. The method according to claim 1, wherein for each of said primary digital data streams, a sequence of sequential pre-processing operations comprising reading operations with respect to said primary digital data streams is generated.

12. The method according to claim 11, wherein the total numbers of sequence elements of each sequence of operations are identical and/or dependent on the temporal relationship and/or the temporal order of said primary digital data streams.

13. The method according to claim 11, wherein said sequence of pre-processing operations, comprising said reading operations with respect to said primary digital data streams, is chosen and/or designed to realize in each case a modified temporal relationship and/or a temporal order of the primary digital data streams, if the respective pre-processing operations are applied to said primary digital data streams in a sequential order.

14. The method according to claim 11, wherein said sequence of pre-processing operations is given as a processing table and/or as a processing list.

15. The method according to claim 1, wherein said primary digital data streams are chosen from a group comprising video data streams, audio data streams, and helper data streams.

16. An apparatus configured to perform the method for synchronizing packet-based digital data streams according to claim 1.

17. A computer-readable medium including computer executable instructions, wherein the instructions, when executed by a processor, cause the processor to perform the method for synchronizing packet-based digital data streams according to claim 1.

18. The method according to claim 11, wherein said sequence of sequential pre-processing operations is generated within said state machine process and/or generated as at least a part of said synchronization state data.

19. The method according to claim 1, wherein at least two primary packet-based digital data streams are being synchronized.

* * * * *